United States Patent
Winter et al.

[11] Patent Number: 6,014,247
[45] Date of Patent: Jan. 11, 2000

[54] ELECTRONIC INK DIMMING MIRROR

[75] Inventors: Michael Winter, New Haven, Conn.;
Ronald K. Reich, Saline, Mich.

[73] Assignee: Lear Automotive Dearborn, Inc.,
Southfield, Mich.

[21] Appl. No.: 09/092,222

[22] Filed: Jun. 5, 1998

[51] Int. Cl.⁷ ...................................................... G02B 1/06
[52] U.S. Cl. ........................ 359/296; 359/253; 359/604
[58] Field of Search .................................. 359/296, 253,
359/603, 604, 321; 428/402, 402.2, 403, 407

[56] References Cited

U.S. PATENT DOCUMENTS

| | | | |
|---|---|---|---|
| 3,341,274 | 9/1967 | Marks | 359/296 |
| 3,655,267 | 4/1972 | Forlini | 359/296 |
| 4,087,376 | 5/1978 | Foris et al. | 252/316 |
| 4,126,854 | 11/1978 | Sheridon | 359/296 |
| 4,919,521 | 4/1990 | Tada et al. | 359/296 |
| 5,409,734 | 4/1995 | Lee et al. | 427/163.1 |
| 5,463,492 | 10/1995 | Check, III | 359/296 |
| 5,650,872 | 7/1997 | Saxe et al. | 359/296 |
| 5,691,849 | 11/1997 | Ledroit et al. | 350/603 |
| 5,838,482 | 11/1998 | Decroupet et al. | 359/253 |

*Primary Examiner*—Georgia Epps
*Assistant Examiner*—Margaret Burke
*Attorney, Agent, or Firm*—Brooks & Kushman PC

[57] ABSTRACT

The present invention provides a self-dimming mirror for a vehicle. The mirror includes a layer of microspheres which contain microparticles and a dielectric liquid. The microparticles have an electrical charge and move between a dispersed state and a segregated state in response to the polarity of an electrical charge on an adjacent electrode. In a first embodiment, the microparticles are reflective and their reflectivity of an incidence light is determined by whether the microparticles are in the dispersed state or the segregated state. In a second embodiment, microparticles include a pigment layer and the transmissivity of an incidence light through the microsphere is determined by whether the microparticles are in a dispersed state or a segregated state. Thus, the present invention provides an electronic dimming mechanism for a mirror.

15 Claims, 3 Drawing Sheets

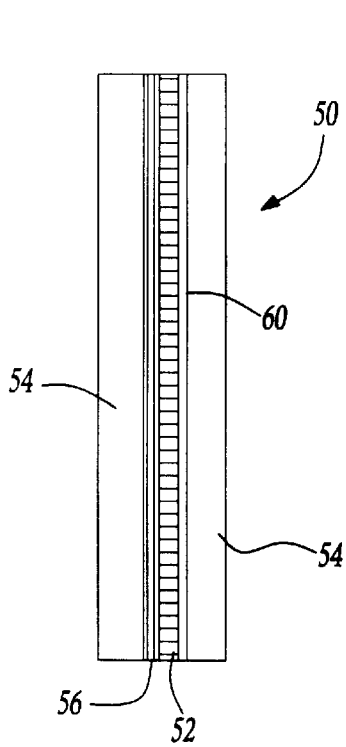
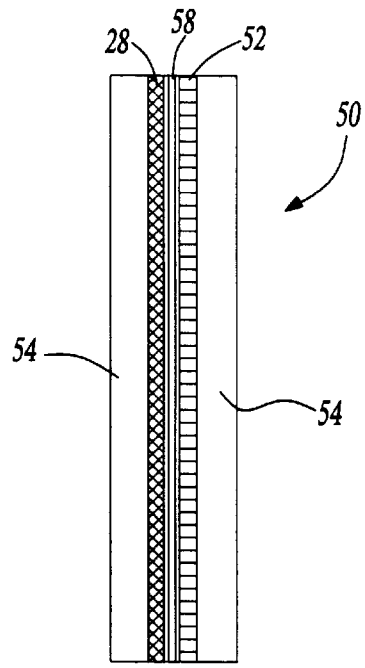
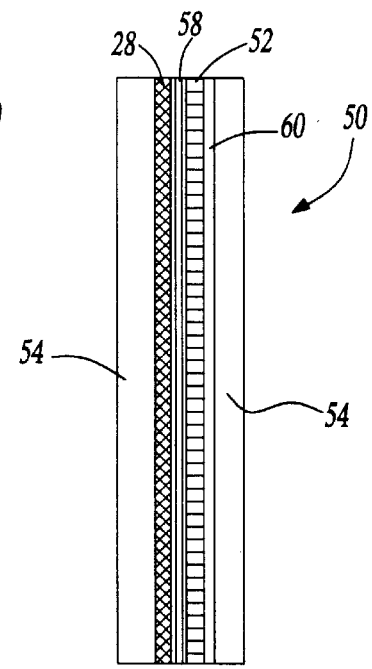
Fig-7B     Fig-8A     Fig-8B
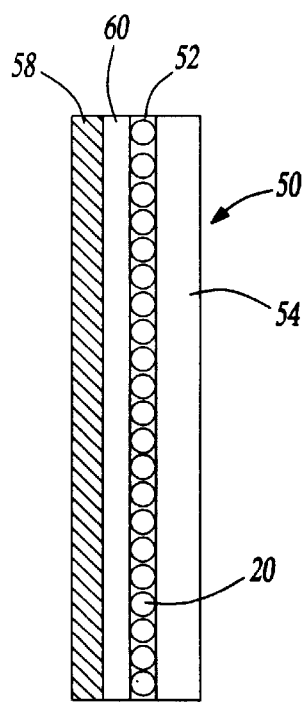
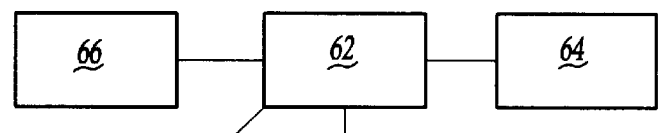
Fig-9     Fig-10
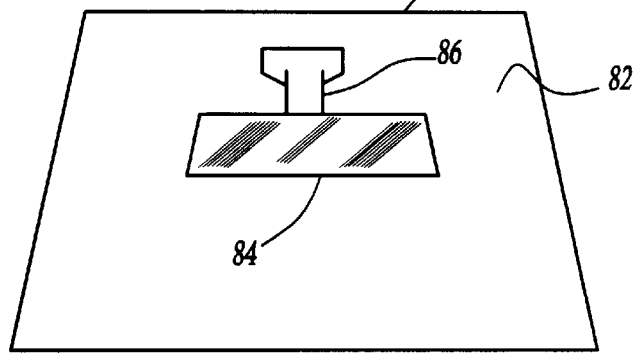
Fig-11

ELECTRONIC INK DIMMING MIRROR

BACKGROUND OF THE INVENTION

This invention relates generally to mirrors for vehicles and, more particularly, to mirrors that are capable of dimming in response to a high intensity incidence light.

Vehicles generally include an interior rearview mirror and two side exterior rearview mirrors. During nighttime driving conditions, a persistent problem for the driver has been glare caused by the reflection of following vehicle headlights in these rearview mirrors. Thus, there is a need to reduce this glare while permitting the driver to see behind the vehicle.

Prior art solutions to nighttime headlight glare have included manual manipulation of the interior rearview mirror and electronic dimming of the rearview mirrors. In the prior art, electronic dimming of the rearview mirrors has comprised the use of electrochromic films or gels that alter their transmissivity based on electrochromic effects in liquid crystals. These electronic systems modify the state of charge in an electric field surrounding the liquid crystals in the film or gel on the mirror. The net result of a modification in the state of charge is a change in the reflectivity of the mirror.

One disadvantage with prior electronic dimming methods has been the cost. In addition, these prior art electronic systems generally respond slowly to the glare from following vehicle headlights.

Thus, it is desirable to provide a low cost electronic dimming mechanism for rearview mirrors. It is furthermore desirable to provide such an electronic dimming mechanism that responds more rapidly to the presence of following vehicle headlights at nighttime.

SUMMARY OF THE INVENTION

In general terms, this invention provides an electronic dimming mechanism for a mirror that dims the mirror in response to following vehicle headlights at nighttime.

In a first embodiment of the present invention, a support layer supports a plurality of microspheres. Each of the microspheres contains a dielectric liquid and a plurality of reflective microparticles. Each of the reflective microparticles has an electric charge of a first polarity and is movable between a first state and a second state. When in the first state, the microparticles have a first reflectivity of an incidence light and when in the second state, the microparticles have a second reflectivity of the incidence light. The first reflectivity is different from the second reflectivity. The mirror further comprises an electrode capable of alternating between the electrical charge of the first polarity and an electrical charge of a second polarity that is opposite from the first polarity. The microparticles move between the first state and the second state in response to the electrode alternating between the first polarity and the second polarity. In a preferred embodiment, the microparticles are dispersed when in the first state and segregated when in the second state, with the first reflectivity of the incidence light being less than the second reflectivity of the incidence light and the microparticles are moved from the first state to the second state when the electrode alternates from the first polarity to the second polarity.

In a second embodiment of the present invention, the mirror comprises a support layer supporting a plurality of microspheres each of which of has a dielectric liquid and a plurality of microparticles. The microparticles each have an electrical charge of a first polarity and are movable between a first state and a second state. The microspheres have a first transmissivity of an incidence light when the microparticles are in the first state and a second transmissivity of the incidence light when the microparticles are in the second state, with the first transmissivity being different from the second transmissivity. The mirror further includes an electrode capable of alternating between the electrical charge of the first polarity and an electrical charge of a second polarity opposite the first polarity. In addition, the mirror includes a reflective layer. The microparticles are movable between the first state and the second state in response to the electrode alternating between the first polarity and the second polarity. In a preferred embodiment, the microparticles are dispersed when they are in the first state and they are segregated when they are in the second state, thus the first transmissivity of the incidence light is greater than the second transmissivity of the incidence light and the microparticles move from the first state to the second when the electrode alternates from the first polarity to the second polarity.

These and other features and advantages of this invention will become more apparent to those skilled in the art from the following detailed description of the presently preferred embodiment. The drawings that accompany the detailed description can be described as follows.

BRIEF DESCRIPTION OF THE DRAWINGS

FIG. 7B is a cross-sectional view of a mirror designed according to the present invention;

FIG. 8A is a cross-sectional view of a mirror designed according to the present invention;

FIG. 8B is a cross-sectional view of a mirror designed according to the present invention;

FIG. 9 is a cross-sectional view of a mirror designed according to the present invention;

FIG. 10 is a schematic diagram of the interior of a vehicle incorporating a plurality of mirrors designed according to the present invention; and FIG. 11 is a view of a rearview mirror designed according to the present invention mounted to a windshield of a vehicle.

DETAILED DESCRIPTION OF THE PREFERRED EMBODIMENT

Figure 1A:
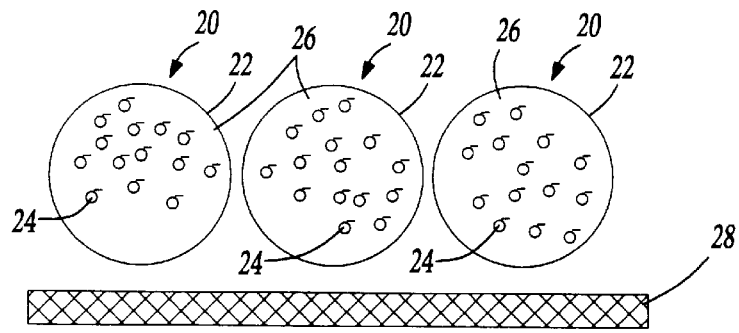
FIG. 1A is a cross-sectional view of a plurality of microspheres containing microparticles in a dispersed state.

A microsphere is generally indicated at 20 in FIG. 1A. Microsphere 20 includes an outer shell 22 surrounding a plurality of microparticles 24 suspended in a dielectric liquid 26. Microparticle 24 has an electrical charge of either of negative or a positive polarity. In FIG. 1A, all of the microparticles 24 are shown as having a negative charge. Microspheres 20 are adjacent an electrode 28. In FIG. 1A, microparticles 24 are shown in a dispersed state. When microparticles 24 are in a dispersed state, electrode 28 either is not polarized or has an electrical charge of the same polarity as microparticles 24. As will be understood by one having ordinary skill in the art, microparticles 24 could also have a positive electrical charge.

Figure 1B:
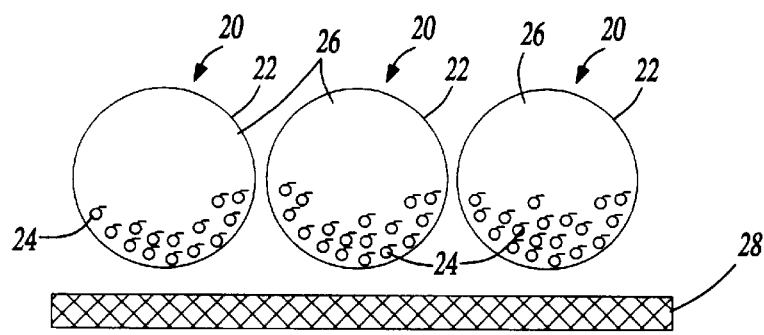
FIG. 1B is a cross-sectional side view of FIG. 1A when the microparticles are in a segregated state.

In FIG. 1B, microparticles 24 are shown in a segregated state. When electrode 28 is given an electrical charge having a polarity opposite the electrical charge of microparticles 24, then microparticles 24 are attracted toward electrode 28. Thus, microparticles 24 are segregated toward the side of microsphere 20 adjacent electrode 28. Although microspheres 20 are shown as having a spherical shape, as will be understood by one having ordinary skill in the art, the shape of outer shell 22 could be a variety of shapes, for example, outer shell 22 could be hexagonal or oblong.

Preferably microspheres 20 are dispersed in a binder, as in known in the art, and are capable of being deposited using a printing process. Microspheres 20 may also be dispersed in a carrier fluid to permit injection of microspheres 20 between glass or plastic plates. Dielectric liquid 26 should have high electrical resistivity and act as a good solvent for a dye (not shown) that is included in dielectric liquid 26, but be a poor solvent for microparticles 24. Preferably, dielectric liquid 26 and microparticle 24 have colors that are different from each other. Most preferably, the specific gravity of this suspension of microparticles 24 in dielectric liquid 26 should match the specific gravity of microparticles 24.

Encapsulation of dielectric liquid 26 and microparticles 24 into outer shell 22 of microsphere 20 may be accomplished in a number of ways. Numerous suitable procedures for encapsulation in microspheres are known in the art. In general, the processes fall into several categories, all of which can be applied to the present invention; interfacial polymerization, in-situ polymerization, physical processes, in-liquid curing, and simple\complex coacervation.

A microencapsulation technique that is most preferable for the present invention is set forth in U.S. Pat. No. 4,087,376, the entire disclosure of which is hereby incorporated by reference. The procedure involves a polymerization between urea and formaldehyde in an aqueous phase of an oil\water emulsion in the presence of a negatively charged, carboxyl-substituted, linear aliphatic hydrocarbon polyelectrolyte material. The resulting outer shell 22 is a urea\formaldehyde copolymer, which discretely encloses microparticles 24 and dielectric liquid 26. The resulting microsphere 20 is clear, mechanically strong, and has good resistivity properties.

Figures 2A, 2B, 2C:
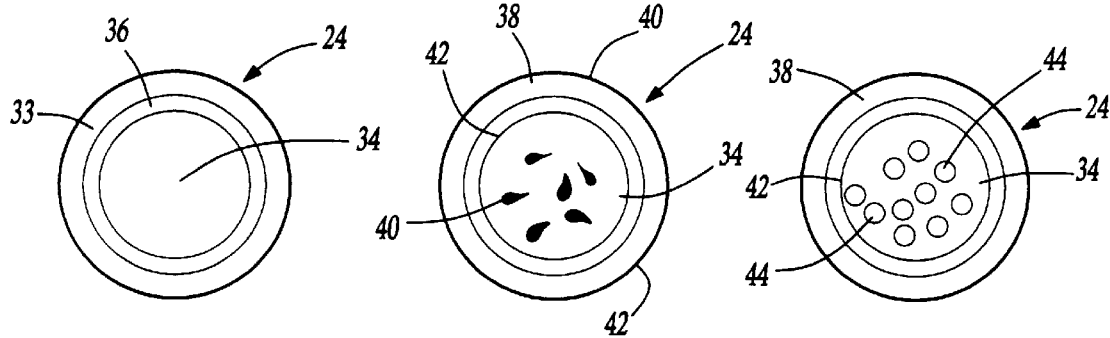
FIG. 2A is a cross-sectional view of one embodiment of a microparticle.
FIG. 2B is a cross-sectional view of one embodiment of a microparticle.
FIG. 2C is a cross-sectional view of one embodiment of a microparticle.
Figures 2D, 2E:
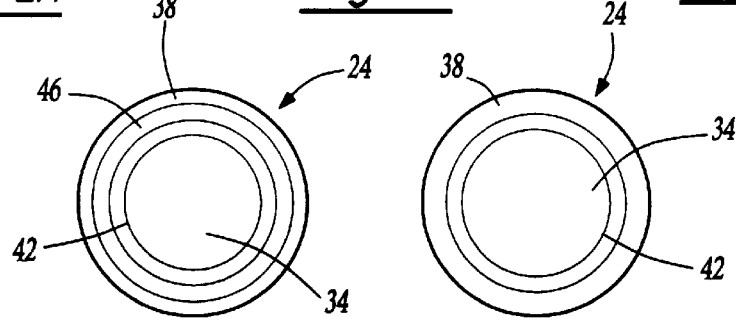
FIG. 2D is a cross-sectional view of one embodiment of a microparticle.
FIG. 2E is a cross-sectional view of one embodiment of a microparticle.

In FIGS. 2A–E, a number of embodiments of suitable microparticles 24 are disclosed. In FIGS. 2A–D, microparticle 24 is a reflective microparticle. In FIG. 2E, a pigmented microparticle 24 is disclosed.

In FIG. 2A, a microparticle core 34 is surrounded by a metal layer 36 and a charge retaining layer 38.

In FIG. 2B, a plurality of metallic flakes 40 are embedded in microparticle core 34. Microparticle core 34 is surrounded by a pigment layer 42 and charge retaining layer 38.

In FIG. 2C, a plurality of glass spheres 44 are embedded in microparticle core 34. Microparticle core 34 is surrounded by pigment layer 42 and charge retaining layer 38.

In FIG. 2D, microparticle core 34 is covered by pigment layer 42, a clear shell layer 46 and charge retaining layer 38.

In FIG. 2E, microparticle core 34 is surrounded by pigment layer 42 and charge retaining layer 38.

In a preferred embodiment, microparticle core 34 comprises a pigment itself. A wide range of pigment particles can serve as microparticle core 34, the primary criteria governing choice being appropriate electrical charge, size, color, and amenability to processing as described below. The size of microparticles 24 can range from 100 $\mu$m to less than 1 $\mu$m, with the preferred size range being between 1 and 5 $\mu$m.

Microparticles 24 may exhibit a native charge, or being charged explicitly using a charge-control agent to form charge retaining layer 38. Such a charge-control agent may be added to pigment particles when forming microparticles 24 or may be adsorbed directly onto microparticle 24. Generally, a suitable charge-control agent confers a surface charge, zeta potential, equal to 50–100 elementary charges on the surface of a microparticle 24 having a radius of 1 $\mu$m; this produces an electrophoretic mobility on the order of $10^{-4}$ to the $10^{-2}/cm^2/V$-sec. Suitable charge-control agents are well known in the art; they may be polymeric or nonpolymeric in nature, and may also be ionic or non-ionic. Non-ionic polymeric charge control agents include polyethylene, polybutene succinimide and various polyvinyl pyridine block copolymers. The charge control agent and any of the other layers should not interfere with the optical properties of microparticles 24.

Microparticles 24 may be manufactured by any of a variety of well-known techniques including: grinding; milling; nozzle atomization, rotary atomization;

ultrasonic techniques; or the electrostatic combination of two atomized mists of polymer building blocks, as well as other conventional approaches to the production of fine powders. Likewise, the charge-control agent could be associated with microparticle 24 by being embedded in a polymer during formation of microparticle 24. Another way to produce a charged microparticle 24 is the well-known technique of triboelectric charging.

As noted above, the microparticles 24 shown in FIGS. 2A–D are embodiments of reflective microparticles 24. In FIG. 2A, metal layer 36 can be applied to microparticle core 34 in accordance with techniques known in the art of metal-layer coating. For example, physical vapor deposition could be used to deposit a layer of aluminum, silver or gold on microparticle core 34 to produce the reflective microparticle 24 shown in FIG. 2A. An additional approach is shown in FIG. 2B wherein, metallic flakes 40 are embedded in a polymer used to form microparticle core 34. Metal flake 40 could be incorporated in such a polymer by simple mixing into the bulk fluid before it is atomized.

In FIG. 2C, a reflective microparticle 24 is produced using retroreflector glass spheres 44, which are embedded in microparticle core 34 to create a reflective microparticle 24. Glass spheres 44 may be colored. In FIG. 2D, a reflective microsphere 24 is produced by surrounding a colored microparticle core 34 with clear shell layer 46. Shell layer 46 acts as a retroreflector. Shell layer 46 could comprise, for example, a transparent plastic such a polyethylene and provides a reflective lens effect. Shell layer 46 could be coated over pigment layer 42 by co-atomizing microparticle core 34 with pigment layer 42 in a molten jet of polyethylene.

In FIG. 2E, microparticle 24 comprises a colored microparticle coated with charge retaining layer 38, the formation of which is detailed above.

As will be understood by one having ordinary skill in the art, microsphere 20 formed using microparticles 24 as shown in FIGS. 2A–D would produce a microsphere 20 that is reflective. The reflectivity of such a microsphere 20 would be altered when microparticles 24 move between a dispersed state as shown in FIG. 1A to a segregated state as shown in FIG. 1B. When microparticles 24 are in the segregated state, the reflectivity of such microsphere 20 is greater than when the microparticles 24 are in a dispersed state. This effect will be particularly apparent when a series of microspheres 20 are arranged in a closely packed two-dimensional arrangement.

Likewise, a microparticle 24 formed in accordance with the example shown in FIG. 2E, when incorporated in a microsphere 20, would permit creation of a microsphere 20 capable of having two transmissivities of an incidence light. Specifically, when microparticles 24 are in a dispersed state, as shown in FIG. 1A, light would be transmitted through microsphere 20 to a greater extent than if microparticles 24 were in a segregated state as shown in FIG. 1B. This effect will be particularly apparent when a series of microspheres 20 are arranged in a closely packed two-dimensional arrangement.

The technology described to this point was developed by inventors other than applicants and is the subject of patent applications filed by those other inventors. Applicants here have applied the above described teachings to provide a self-dimming mirror.

Figure 3:
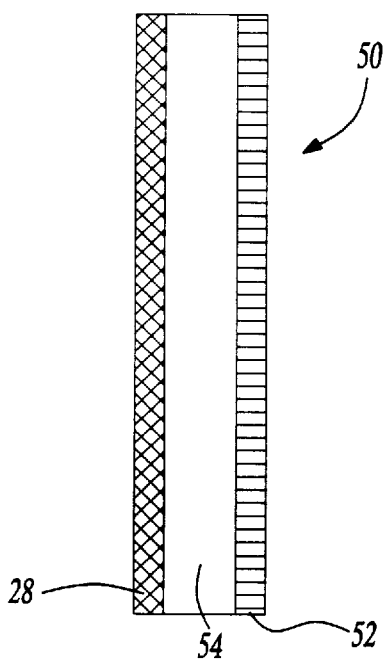
FIG. 3 is a cross-sectional view of a mirror designed according to the present invention.
Figure 4A:
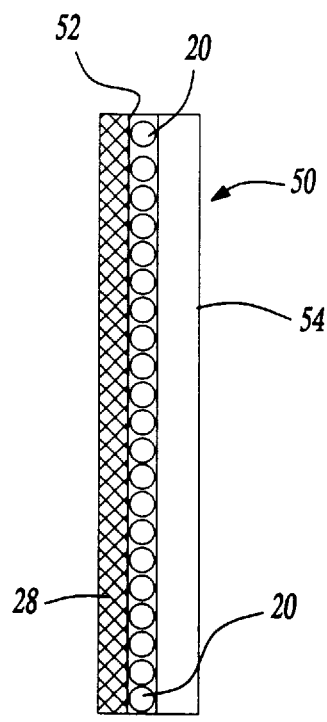
FIG. 4A is a cross-sectional view of a mirror designed according to the present invention.
Figure 4B:
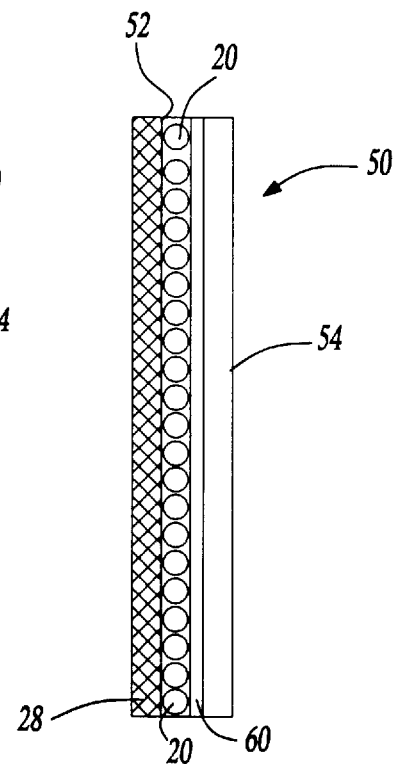
FIG. 4B is a cross-sectional view of a mirror designed according to the present invention.

FIGS. 3 through 4B represent alternatives of one embodiment of the present invention, wherein microspheres 20 contain reflective microparticles 24 making them reflective microspheres 20. In FIG. 3, a cross-sectional side view of a mirror is generally shown at 50. Mirror 50 comprises a microsphere layer 52 supported on a support layer 54. Electrode 28 is adjacent support layer 54. In the most preferred embodiment, microsphere layer 52 is a two dimensional array of microspheres 20. Microspheres 20 are secured to support layer 54 by any of the techniques described above, including by a printing process or incorporation of microsphere layer 52 between an outer film (not shown) and support layer 54. In the most preferred embodiment, support layer 54 is glass. In FIG. 4A, microsphere layer 52 is shown as sandwiched between support layer 54 and electrode 28. In FIG. 4B microsphere layer 52 is shown as sandwiched between electrode 28 and a transparent electrode 60. Transparent electrode 60 may be produced by a variety of techniques known in the art. For example, transparent electrodes 60 may comprise a semiconductor such as indium tin oxide evaporated or otherwise coated in a thin layer onto glass, mylar or another transparent substrate.

In use, when microparticles 24 of microsphere layer 52 are segregated, the reflectivity of microsphere layer 52 will be greater than when the microparticles 24 in microsphere layer 52 are in a dispersed state. Thus, reflection of an incidence light (not shown) from following vehicle headlights will be reduced when microparticles 24 are in dispersed state. In the alternatives shown in FIG. 3 and 4A, microparticles 24 are moved between the dispersed state and the segregated state by alternating the polarity of the electrical charge on electrode 28. When electrode 28 has an electrical charge with the same polarity as microparticles 24, then microparticles 24 are in the dispersed state. When electrode 28 has an electrical charge with the opposite polarity as microparticles 24, then microparticles are in the segregated state. In the alternative shown in FIG. 4B, electrode 28 and transparent electrode 60 can be used to move microparticles 24 between the dispersed state and the segregated state. Either electrode 28 or transparent electrode 60 could be provided with an electrical charge of the appropriate polarity to move microparticles 24 between the dispersed state and the segregated state depending on the strength of the electrical field generated by electrode 28 or transparent electrode 60.

FIG. 5 through FIG. 9, each represent an alternative embodiment of mirror 50 wherein, microparticles 24 either include pigment layer 42 or are formed from a pigment.

Figure 5:
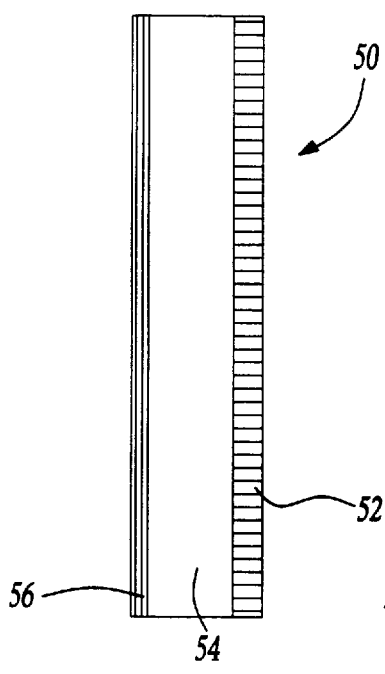
FIG. 5 is a cross-sectional view of a mirror designed according to the present invention.

In FIG. 5, mirror 50 comprises microsphere layer 52 supported on support layer 54 which is adjacent an electrically conductive chrome layer 56, as is known in the art. Thus, chrome layer 56 functions as an electrode.

Figure 6:
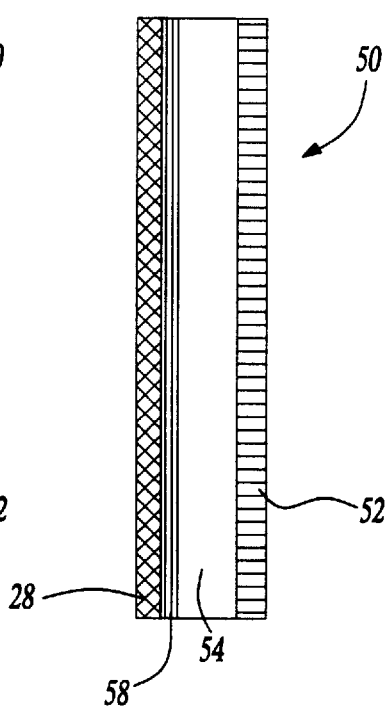
FIG. 6 is a cross-sectional view of a mirror designed according to the present invention.

FIG. 6 is an embodiment of mirror 50 that is similar to that shown in FIG. 5, except mirror 50 includes an electrically non-conductive chrome layer 58 between support layer 54 and electrode 28.

Figure 7A:
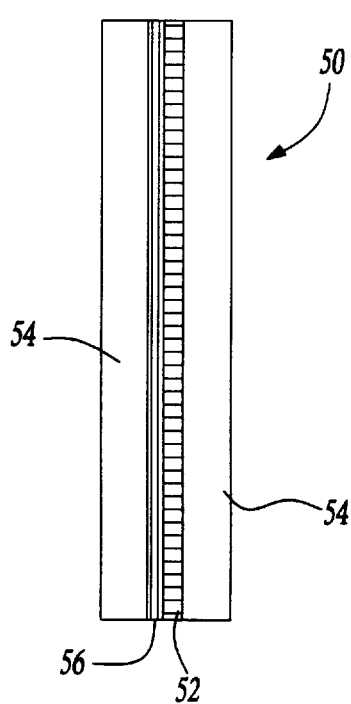
FIG. 7A is a cross-sectional view of a mirror designed according to the present invention.

In FIG. 7A, mirror 50 comprises two outer support layers 54 with conductive chrome layer 56 and microsphere layer 52 sandwiched between support layers 54.

In FIG. 7B, mirror 50 comprises two outer support layers 54 with microsphere layer 52 sandwiched between conductive chrome layer 56 and transparent electrode 60.

In FIG. 8A, mirror 50 comprises a sandwich having successive layers of support layer 54, electrode 28, non-conductive chrome layer 58, microsphere layer 52 and support layer 54.

In FIG. 8B, mirror 50 comprises a sandwich having successive layers of support layer 54, electrode 28, non-conductive chrome layer 58, microsphere layer 52, transparent electrode 60 and support layer 54.

In FIG. 9, mirror 50 consists of non-conductive chrome layer 58 adjacent transparent electrode 60, with microsphere layer 52 sandwiched between support layer 54 and transparent electrode 60. As will be understood by one having ordinary skill in the art, the embodiment shown in FIG. 9 could further include a second transparent electrode (not shown) with microsphere layer 52 sandwiched between transparent electrode 60 and the second transparent electrode.

In use of the embodiments shown in FIGS. 5–9, an incidence light (not shown) must pass through microsphere layer 52 prior to striking either non-conductive chrome layer 58 or conductive chrome layer 56, both of which will subsequently reflect the incidence light toward a viewer of mirror 50. When, microparticles 24 of microsphere layer 52 are in a dispersed state, as shown in FIG. 1A, the amount of incidence light transmitted through microsphere layer 52 will be greater than when microparticles 24 are in a segregated state, as shown in FIG. 1B. Thus, the state of microparticles 24 in microsphere layer 52 will determine the transmissivity of an incidence light through microsphere layer 52. In the most preferred embodiment, microparticles 24 have a dark pigment layer 42 to thus provide a darkening of mirror 50. In FIGS. 5, 6, 7A, 8A, and 9 mirror 50 includes only a single electrode which moves microparticles 24 between the dispersed state and the segregated state as described above with respect to FIGS. 3 and 4A. In FIGS. 7B and 8B, mirror 50 includes a pair of electrodes that move microparticles 24 between the segregated and dispersed state as described above with respect to FIG. 4B.

FIG. 10 is a schematic of an interior of a vehicle (not shown) incorporating a plurality of mirrors designed according to the present invention. Preferably, the vehicle includes an interior rearview mirror 62, a right exterior rearview mirror 64 and a left exterior rearview mirror 66, all of which are electrically connected to each other. An incidence light sensor 68 is electrically coupled to interior rearview mirror 62 and an electrical power source 70. A sensitivity control 72 is connected to sensor 68. In the most preferred embodiment, incidence light sensor 68 detects the intensity of an incidence light, such as the light from following vehicle headlights. When the intensity of an incidence light exceeds a pre-determined threshold, incidence light sensor 68 permits electrical power source to polarize either electrode 28, conductive chrome layer 56, or transparent electrode 60 with an appropriate polarity to move microparticles 24 between a dispersed state and a segregated state as appropriate.

For example, in the embodiments shown in FIGS. 3, 4A and 4B when the intensity of an incidence light from the headlights of a following vehicle exceeds the threshold sensor 68 permits electrical power source 70 to polarize electrode 28 or transparent electrode 60 with an electric charge having a polarity the same as that of the charge carried by microparticles 24. Thus, microparticles 24 will be moved to a dispersed state and thus lower the reflectivity of incidence light through microsphere layer 52 thereby reducing the glare on a driver caused by following vehicle headlights.

In the embodiments shown in FIGS. 5–9, when the intensity of an incidence light from the headlights of a following vehicle exceeds the threshold sensor 68 permits electrical power source 70 to polarize electrode 28, chrome layer 56, or transparent electrode 60 with an electric charge having a polarity opposite that of the charge carried by microparticles 24. Thus, microparticles 24 will be moved to a segregated state and thus lower the transmissivity of incidence light through microsphere layer 52 thereby reducing the glare on a driver caused by following vehicle headlights.

In an alternative embodiment, incidence light sensor 68 may compare the intensity of an incidence light to the intensity of ambient light in order to determine when the difference between the two exceeds the pre-determined threshold. The pre-determined threshold may either be fixed by design or altered by sensitivity control 72.

In FIG. 11 a windshield 80 of a vehicle is shown. Windshield 80 includes an interior surface 82. A rearview mirror 84 is secured to interior surface 82 by a mount 86. Mirror 84 can be created using any of the embodiments described above in FIGS. 1–10.

The present invention has been described in accordance with the relevant legal standards, thus the foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

We claim:

1. A self-dimming mirror for a vehicle comprising:

a support layer supporting a plurality of microspheres;

each of said microspheres each having a dielectric liquid and a plurality of reflective microparticles, each of said reflective microparticles having an electrical charge of a first polarity and movable between a first state and a second state, wherein in said first state said microparticles are dispersed within said dielectric fluid and in said second state said microparticles are segregated within said dielectric fluid;

said microspheres having a first reflectivity of an incidence light when said microparticles are in said first state and a second reflectivity of said incidence light when said microparticles are in said second state, said first reflectivity being less than said second reflectivity;

a first electrode capable of alternating between said electrical charge of said first polarity and an electrical charge of a second polarity opposite said first polarity; and said microparticles moving between said first state and said second state in response to said first electrode alternating between said first polarity and said second polarity.

2. A self-dimming mirror as recited in claim 1 further comprising a source of electrical power, said electrical power alternating said first electrode between said first polarity and said second polarity.

3. A self-dimming mirror as recited in claim 1 further comprising a means for detecting an amount of said incidence light;

said electrical power switching said first electrode to said first polarity when said amount of said incidence light exceeds a pre-determined threshold; and said microparticles moving to said dispersed state when said first electrode is switched to said first polarity, thereby reducing the reflectivity of said microspheres.

4. A self-dimming mirror as recited in claim 1 wherein said microparticles comprise one of reflective metallic flakes and a metallic coating on said microparticle.

5. A self-dimming mirror as recited in claim 1 wherein said support layer comprises glass.

6. A self-dimming mirror as recited in claim 1 wherein said first electrode comprises a substantially transparent electrode.

7. A self-dimming mirror as recited in claim 1 wherein said first electrode comprises a reflective chrome layer.

8. A self-dimming mirror as recited in claim 1 further including a second electrode capable of alternating between said electrical charge of said first polarity and an electrical charge of a second polarity opposite said first polarity, said microparticles moving between said dispersed state and said segregated state in response to the polarity of the electrical charges on said first electrode and said second electrode.

9. A self-dimming mirror comprising:

a support layer supporting a plurality of microspheres;

each of said microspheres each having a dielectric liquid and a plurality of microparticles, each of said microparticles having an electrical charge of a first polarity and movable between a first state and a second state, wherein in said first state said microparticles are dispersed within said dielectric fluid and in said second state said microparticles are segregated within said dielectric fluid;

said microspheres having a first transmissivity of an incidence light when said microparticles are in said first state and a second transmissivity of said incidence light when said microparticles are in said second state, said first transmissivity being greater than said second transmissivity;

a first electrode capable of alternating between said electrical charge of said first polarity and an electrical charge of a second polarity opposite said first polarity;

a reflective layer; and said microparticles moving between said first state and said second state in response to said first electrode alternating between said first polarity and said second polarity.

10. A self-dimming mirror as recited in claim 9 further comprising a source of electrical power, said electrical power alternating said first electrode between said first polarity and said second polarity.

11. A self-dimming mirror as recited in claim 9 further comprising a means for detecting an amount of said incidence light; and said electrical power switching said first electrode to said second polarity when said amount of said incidence light exceeds a pre-determined threshold;

said microparticles moving to said second state when said first electrode is switched to said second polarity, thereby reducing the transmission of said incidence light.

12. A self-dimming mirror as recited in claim 9 wherein said first electrode comprises a substantially transparent electrode.

13. A self-dimming mirror as recited in claim 9 wherein said reflective layer comprises a chrome layer.

14. A self-dimming mirror as recited in claim 9 wherein said first electrode and said reflective layer comprise a chrome layer.

15. A self-dimming mirror as recited in claim 9 further including a second electrode capable of alternating between said electrical charge of said first polarity and an electrical charge of a second polarity opposite said first polarity, said microparticles moving between said dispersed state and said segregated state in response to the polarity of the electrical charges on said first electrode and said second electrode.

\* \* \* \* \*